United States Patent [19]

Chicurel et al.

[11] Patent Number: 4,480,741
[45] Date of Patent: Nov. 6, 1984

[54] LEHR LOADER APPARATUS

[75] Inventors: Ricardo U. Chicurel; Manuel G. Aguirre, both of Monterrey, Mexico

[73] Assignee: Vitro Tec Fideicomiso, Monterrey, Mexico

[21] Appl. No.: 310,849

[22] Filed: Oct. 13, 1981

[30] Foreign Application Priority Data

Oct. 14, 1980 [MX] Mexico .................................. 184339

[51] Int. Cl.³ .......................................... B65G 47/32
[52] U.S. Cl. .................................................. 198/430
[58] Field of Search ................ 198/430, 429, 433, 740

[56] References Cited

U.S. PATENT DOCUMENTS

| 2,822,910 | 2/1958 | Wachsmuth | 198/430 |
| 3,184,031 | 5/1965 | Dunlap | 198/430 |
| 4,067,434 | 1/1978 | Mumford | 198/430 X |
| 4,290,517 | 9/1981 | Haffeskamp | 198/430 X |

OTHER PUBLICATIONS

Brown, *Mechanical Movements*, 17th ed., Brown & Seuard, N.Y., N.Y., 1893.

*Primary Examiner*—Jeffrey V. Nase
*Attorney, Agent, or Firm*—Kemon & Estabrook

[57] ABSTRACT

The present invention relates to a lehr loader apparatus generally of the type shown in U.S. Pat. No. 4,067,434. The improvement here lies in a mechanical coupling between the prime mover and the pusher bar cam which permits the total time of the forward pushing stroke to be greater than the time of the return stroke for any given speed of operation of the apparatus.

1 Claim, 6 Drawing Figures

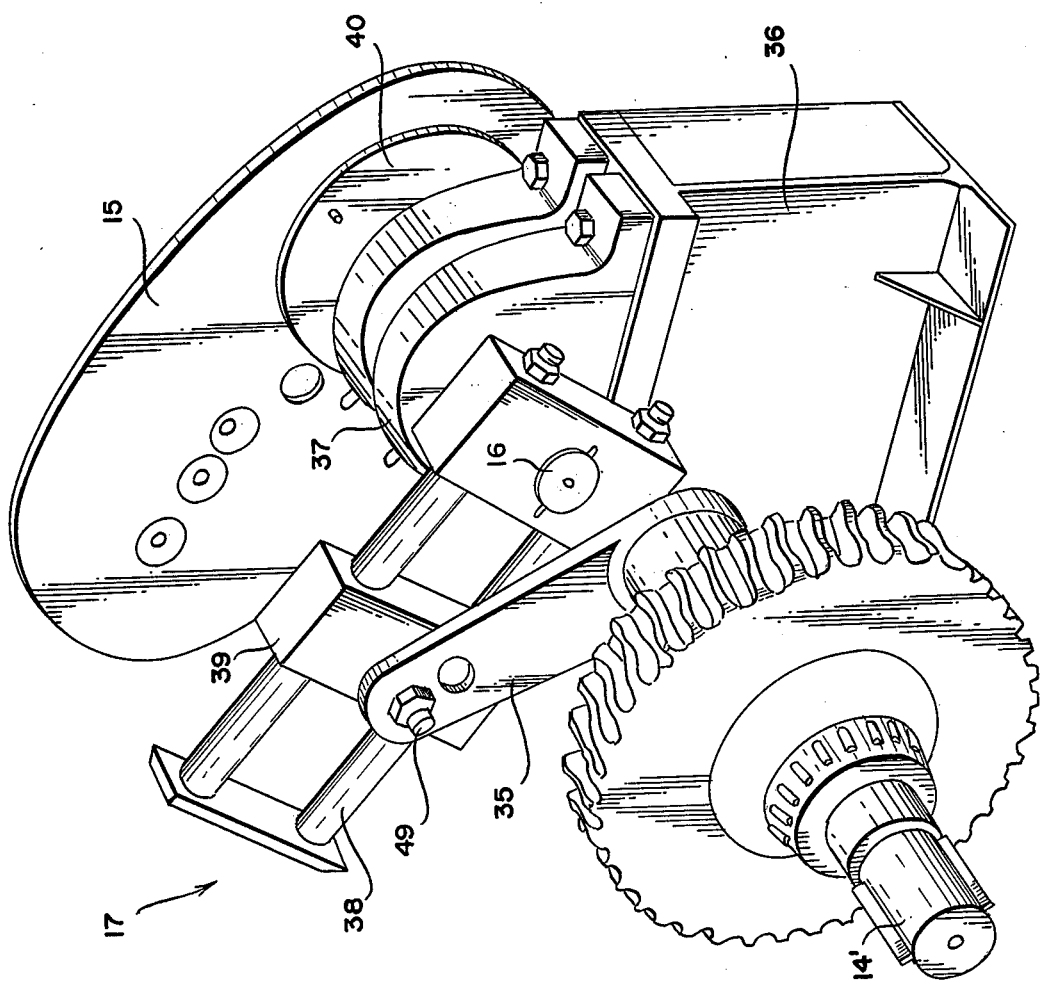

LEHR LOADER APPARATUS

BACKGROUND OF THE INVENTION

In the production of glass containers, such as bottles, jars, etc., in an automatic machine of the I.S. type, molten glass in the form of gobs is fed and distributed by means of a distributor, to the individual forming sections (generally eight) where the glass is shaped into a container.

The containers formed by each of the individual forming sections of the machine, while still hot, are deposited first on the dead plate of the respective section and from there they are pushed up to a transfer conveyor called a "carrier" which moves the containers of all of sections up to a "transfer" placed at the end of the carrier. The transfer regulates the movement of the containers separating them uniformly and changing their direction of travel by 90°, and deposits them one by one, uniformly spaced in a row, on a cross conveyor. Once a complete row is formed, a transfer device or mechanical pusher, simultaneously transfers all the containers from the cross conveyor to the lineal conveyor of a lehr, wherein they are exposed to a tempering process which eliminates the residual stresses accumulated in the glass due to fast cooling during the fabrication process.

Pusher devices of the prior art generally consist of a pusher rod which pushes the bottles or articles advancing in a row on the cross conveyor, to the edge of the lehr belt. The movements of the pusher rod and the "transfer" are synchronized to coordinate the operation of loading glass articles into the lehrs. The pusher rod is generally coupled to a frame which transmits movements of pushing, elevation and return, for each row of bottles formed on the cross conveyor.

An example of known pusher apparatus may be found in U.S. Pat. No. 3,040,867 of June 26, 1962. In this patent, a transfer mechanism placed adjacent the cross conveyor and generally aligned with the lehr conveyor, simultaneously transfers a plurality of articles from the cross conveyor to the lehr conveyor. Movement of the pusher is first perpendicular to the cross conveyor to make contact with the articles, then diagonally in the general direction of movement of the cross conveyor in order to avoid the next row of containers and then longitudinally of the lehr conveyor.

U.S. Pat. No. 3,184,031 of May 18, 1965 describes a pusher apparatus of the type which pushes or transfers the bottles in a diagonal path relative to the motion of the cross conveyor, until transferring the bottles at the entrance of a lehr. The pusher bar is then elevated and retracted after the bottles have been pushed to a position behind the next row of bottles formed over the cross conveyor and then lowered to begin a new transfer cycle. The pusher of this patent comprises fundamentally a transfer mechanism which includes one cam for controlling the upward and downward movements of the pusher rods and another cam which controls the advance and return movement of the pusher rod. Both cam movements are controlled by independent drive mechanisms and are synchronized to the pusher rod to follow a predetermined path.

In U.S. Pat. No. 3,960,266 of June 1, 1976, a pusher apparatus is described which transfers the bottles simultaneously from a position where they travel on the cross conveyor in a given direction, to another position where they travel on the lehr conveyor at a slower speed in another direction transverse to the first by means of an angular movement of 90° of the pusher apparatus. This transfer sequence is imparted by a crank in the drive shaft which through a connecting rod causes an oscillatory motion through 90° of a pivoted arm.

Finally in U.S. Pat. No. 4,067,434 of Jan. 10, 1978, a pusher is described of the type that pushes a row of glass containers from the cross conveyor to a transition dead plate and from the dead plate to a lineal conveyor of the lehr. The pusher apparatus of this patent is generally constituted by a fixed base having in its upper part a support frame which is positioned opposite to the entrance of the lehr. The support frame comprises a transfer mechanism to transfer simultaneously a plurality of articles in a transfer path by means of both lateral and forward movement. The pusher apparatus of this patent has a stabilizing rod mounted in the transfer mechanism, which is placed beyond the container rows and advances and returns together with the pusher rod preventing the containers from falling forward or backward while they are moved from the cross conveyor to the lehr conveyor. Up to now, this type of pusher has been considered to be the most functional because 90% of the bottlesproduced are conveyed in the range of velocities that can be handled. Nevertheless, the introduction of faster mechanisms such as the I.S. machine of eight sections and greater production output will require handling a greater quantity of articles in a smoother and faster way without causing the articles to fall during the pushing transfer. In practically all the pusher apparatus in use today, the motion of the pusher rod is imparted by means of cams and bar mechanisms which generate a pushing stroke which takes a shorter time than the time of the return stroke. For this reason, it is practically impossible to achieve greater operation velocities of the pushers because the excessive velocity of pushing causes the articles to fall resulting in a reduced output of the finished product. The inventors here, however, have discovered that because no articles are handled during their return stroke of the pusher, it is not imparative to follow a smooth path during the return stroke. Therefore, it is possible to increase the total time of the pushing stroke while decreasing the time of the return stroke and as a result the smoothness of the pushing stroke is increased and therefore allowed a greater operating velocity of the overall machine. This is achieved by means of a quick return mechanism positioned between the cam and the drive means in such a way that the stroke angle of the drive means during the pushing path is greater than the corresponding angle during the return path.

BRIEF SUMMARY OF THE INVENTION

Taking into account the features of the prior art, it is a primary object of the present invention to provide an apparatus for the transfer of glass containers which is capable of increasing the pushing time of the articles making the pushing stroke smooth while reducing the return time.

It is another object of the present invention to provide an apparatus having a better pushing transfer resulting in a greater time and smoothness in the pushing stroke and/or a greater operating velocity.

Another object of the present invention is to provide an apparatus which is capable of handling the highest production capabilities of the forming machines.

Another object of the present invention is to provide an improved transfer apparatus having an increased efficacy and efficiency at a lower competitive cost.

The apparatus according to the present invention includes a frame for supporting the drive system and the pusher bar. The drive system is constituted by at least a cam coupled to the drive means, sliding members coupled to each cam and the pusher bar coupled to the sliding members which pusher bar is moved in the desired transfer path. The quick return mechanism interposed between the primary drive means and the cam is such that the return stroke of the pusher bar occupies a smaller portion of the overall cycle than does the forward or pushing stroke.

BRIEF DESCRIPTION OF THE DRAWINGS

FIG. 6 is a perspective view of the quick return mechanism of the transfer apparatus of the present invention.

DETAILED DESCRIPTION

Figure 1:
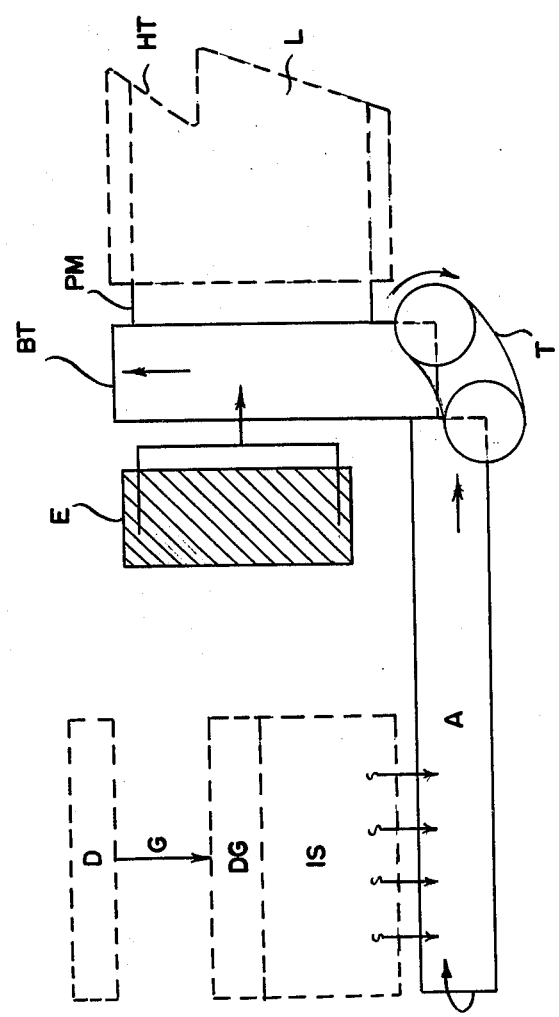
FIG. 1 is a schematic diagram of the manufacturing process of the glass containers.

Referring first to FIG. 1, which shows a schematic diagram of the manufacturing process of glass containers such as bottles, jars, etc., molten glass in the form of gobs is fed through a doser D in the form of gobs G which are distributed by means of a distributor DG to the individual forming sections S (generally eight) which constitute the I.S. machine where the glass is given the desired form. The containers formed by each one of the individual forming sections S of the I.S. machine, while still hot, are deposited first on the dead plate of the respective section (not shown) and from there they are pushed to a conveyor A called a "carrier" which carries the containers to a "transfer" T located at the end of the conveyor. The transfer regulates the passage of the containers, separating them uniformly and changing the direction of their path 90° and deposits them one by one in line and uniformly spaced on a cross conveyor BT. Once a complete row is formed, a transfer device or pusher E simultaneously transfers the entire row of containers from the cross conveyor BT through transition dead plates PM to the lineal conveyor L of a lehr HT.

Referring now to FIGS. 2 to 6, the improved article transfer apparatus of the present invention is shown. It is generally constituted by a base 10, support frame 11, mounted on the base 10 and located in alignment with the entrance of the lehr HT and a motor contained within the base 10, which through a gear box 13 fixed to the support frame 11 drives the transfer apparatus.

The support frame 11, has at its rear end, a pair of parallel horizontal supports 12, 12' which form tracks 18, 18' which guide rollers 19, 19' of which only one is visible in this Figure. A horizontal axle 20 connected at its ends to the rollers 19, 19' is attached to horizontally reciprocating frame 21, formed by two parallel side rails 22, 22' tied together at their rear ends by a cross member 23. The front end of the rails 22, 22' are fixed to a rod 25 connected at its ends to a pair of angle members 26, 26'. The angle members are fixed at their upper ends to a horizontal arm 27. The pusher bar 28, is attached to the lower ends of angle members 26, 26'. Bar 28 pushes the bottles aligned on the transfer conveyor BT to the transition deadplates PM and from there to the lineal conveyor L of the lehr HT. Cams 15, 15' which are identically oriented are attached respectively to shafts 16, 16'. The latter shafts are mounted eccentrically with respect to the output shafts 14, 14' of the gear box 13 and transmit a forward, upward and return movement to the pusher bar 28. This movement is possible due to a pair of rods 24, 24' pivotally connected at one end to cams 15, 15' respectively and at the other end respectively to rails 22, 22' of the frame 21. A pair of rollers 29, 29' mounted on frame 11 support the front end of the rails 22, 22' when they are sliding in the pushing operation of the transfer apparatus.

Figure 2:
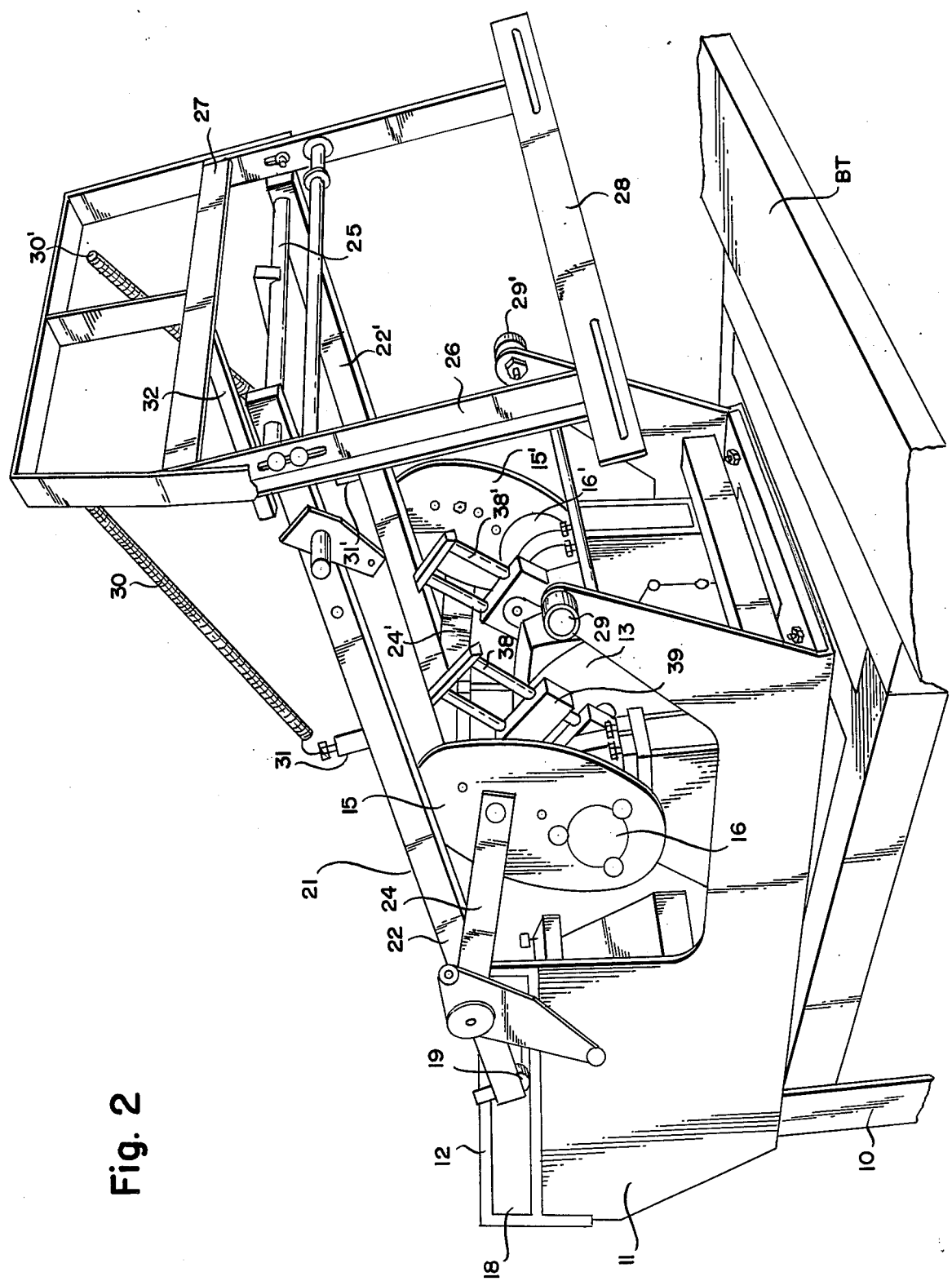
FIG. 2 is a perspective view of the improved article transfer apparatus of the present invention.
Figure 3:
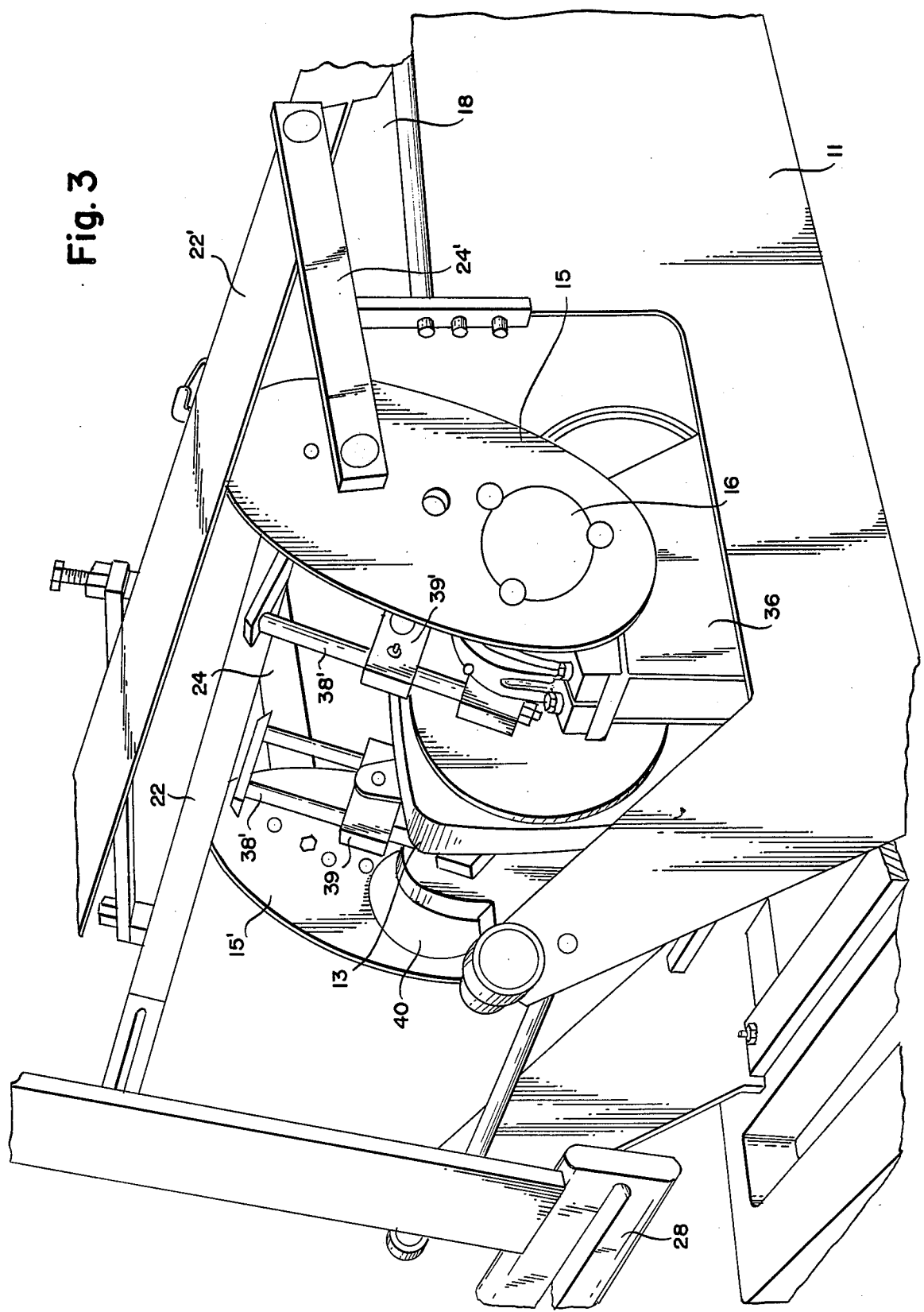
FIG. 3 is a view similar to FIG. 2, but taken from a different angle.
Figure 4:
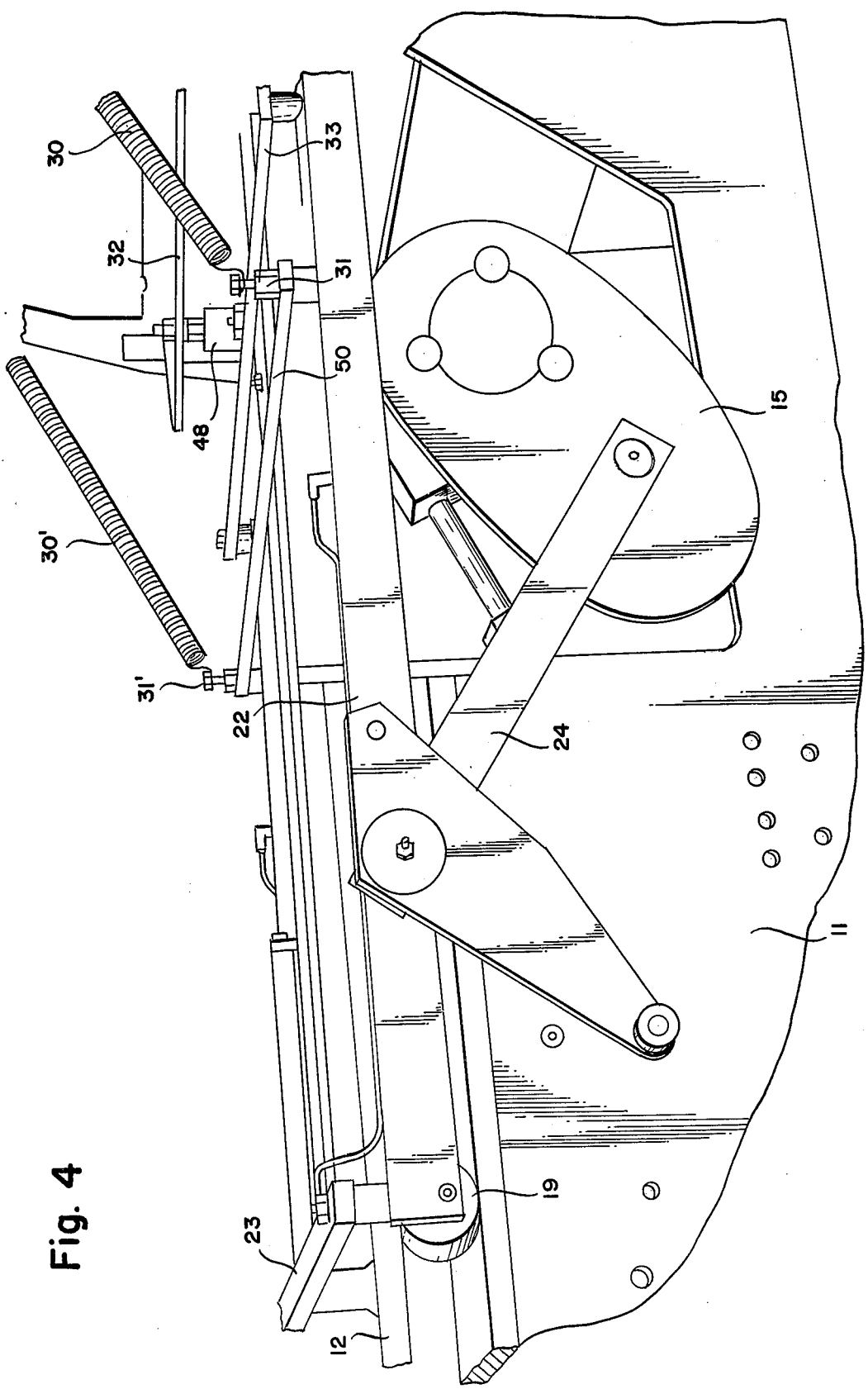
FIG. 4 is a perspective view from the rear of the apparatus shown in FIGS. 2 and 3.
Figure 5:
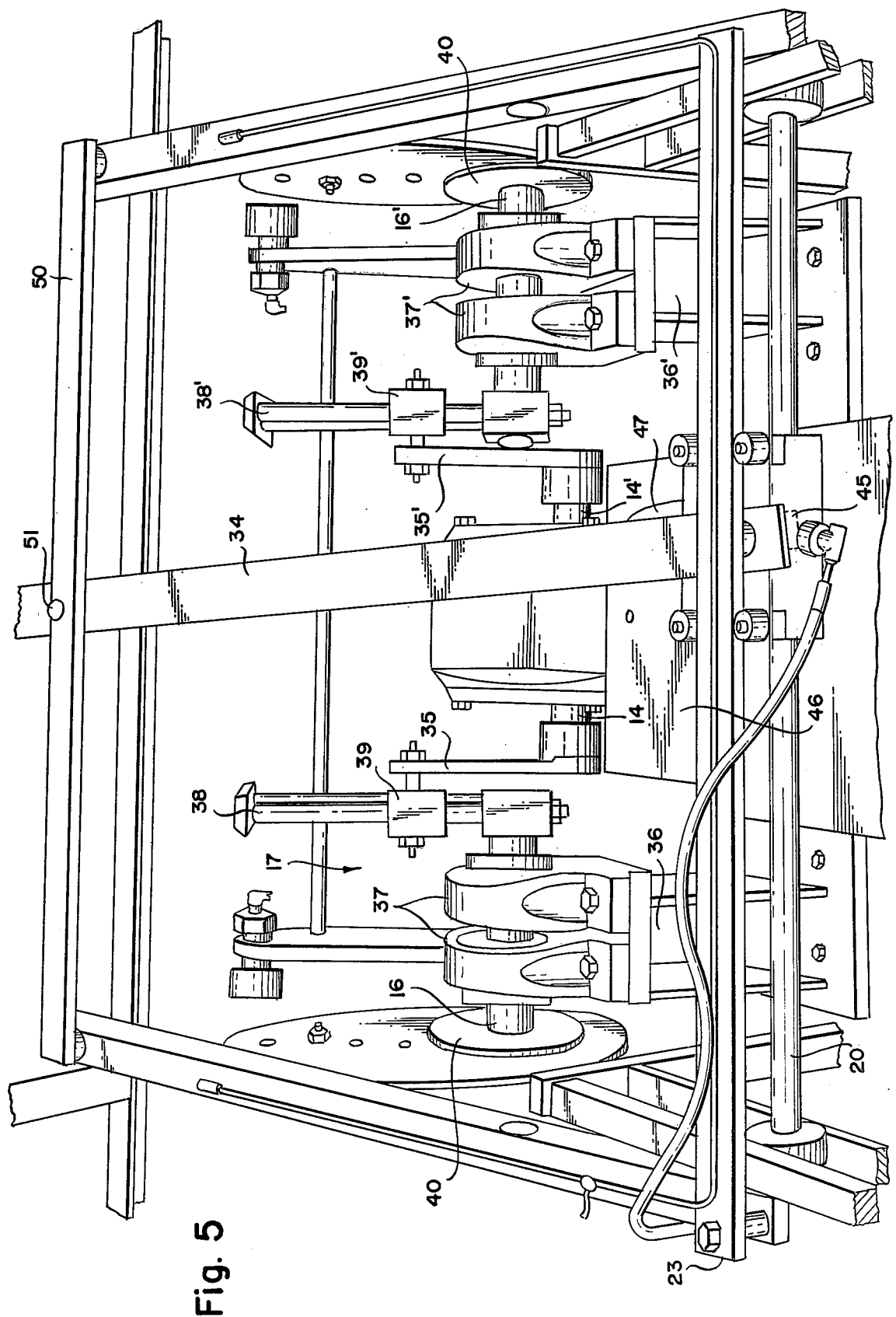
FIG. 5 is a perspective view from the rear and above the apparatus of FIGS. 2 to 4.

This transfer apparatus includes a safety feature which avoids overloading of the driving mechanism by allowing the pusher bar 28 and angle members 26, 26' to rotate around the shaft 25. This rotary movement is limited by an arm 32 perpendicularly attached at one end to the horizontal arm 27 and having at its other end a vertically adjustable roller 48 to limit the counterclockwise rotation of the angle members 26, 26' and the pusher bar 28. As shown in FIG. 2, roller 48 can move laterally on cross member 33 whose ends are connected to rails 22, 22' by a pair of tension springs 30, 30' fastened in posts 31, 31' and to horizontal arm 27 allowing the pusher rod 28 to pivot in case an article obstructs its movement towards the lehr conveyor.

Bar 28 also has a movement along the direction of the cross conveyor BT which is inparted by the front end of a horizontal member 34. Roller 45 is attached to the other end of the member 34 and follows cam track 47 in cam plate 46. Member 34 is pivoted by means of a pin 51 supported by a cross bar 50 which is fixed at its ends to rails 22, 22'. The front end of the member 34 is pivotally attached to shaft 25 as shown in FIG. 1.

This arrangement of member 34 produces a displacement of the pusher bar 28 in the direction of the movement of the cross conveyor BT as the pusher bar 28 moves forward. Thus, bar 28 pushes the article across conveyor BT until the article reaches the dead plate PM and then transmits a forward movement to the article from the dead plates PM and to the lineal conveyor of the lehr HT.

Referring to FIGS. 3, 4, 5 and 6, the quick return mechanism 17 is shown. It comprises pedestals 36, 36' located over the upper part of the base 10 and supporting a pair of bearings 37, 37' which hold cam shafts 16, 16'. These cam shafts are driven at one end by a slider rod and in turn drive the cams 15, 15' through flanges 40, 40' coupled to their other ends. Slides 39, 39' pivoted respectively to the ends of drive cranks 35, 35' by means of pins 49, 49' slide back and forth along slider rods 38, 38'. Such sliding action ensues because drive shafts 14, 14' and cam shafts 16, 16' are eccentric to each other. Thus, when the motor through gear box 13 drives cranks 35, 35', these will rotate in a counterclockwise sense, as shown in FIG. 2 at a constant velocity around center $0_2$ (drive shafts 14, 14') causing slider rods 38, 38' to rotate around center $0_4$ (cam shafts 16, 16') since cranks 35, 35' and slider rods are coupled together respectively through pins 49, 49' and sliders 39, 39'. This arrangement improves the pushing effected by cams 15, 15' (making such action slower) at the expense of the returning action which is faster. This is so because the angle traversed by cranks 35, 35' during the pushing phase of the cycle is greater than the angle traversed by said cranks during the return phase of the cycle.

This action of mechanism 17, shown clearly in FIG. 6 will allow pusher rod 28 to impart a smooth pushing movement to the bottles placed in rows along the cross conveyor BT, transferring them to the dead plates PM and from there to the lehr HT. Subsequently, said pushing rod 28 is elevated, retracted and brought down behind the next row of articles advancing on the cross conveyor BT, to start a new pushing cycle.

While a preferred embodiment of the present invention has been herein shown and described, applicants claim the benefit of a full range of equivalents within the scope of the appended claims.

I claim:

1. Article transfer apparatus for pushing groups of articles from one conveyor to another where the conveyors are perpendicular to each other and in a common plane said apparatus comprising:
   a stationary main frame adjacent to a first conveyor at a point where a second conveyor extends at right angles to and on the opposite sides of the first;
   a movable frame mounted for horizontal sliding movement on said main frame transverse of the first conveyor, said movable frame being also capable of pivotal movement around a horizontal axis at that end of said movable frame remote from the first conveyor;
   a first shaft rotatable on a first horizontal axis in said main frame;
   cam means secured to said first shaft;
   a link pivotally connected at its opposite ends to said cam means and said movable frame;
   a second shaft rotatable on a second horizontal axis in said main frame parallel to but spaced from said first axis;
   a first crank arm rigidly extending from said second shaft;
   a second crank arm rigidly extending from said first shaft;
   means slidingly and pivotally connecting said crank arms; and
   means for rotatably driving said second shaft; whereby said movable frame for each revolution of said second shaft moves horizontally smoothly across the first conveyor at a first rate, pivots upwardly and returns to its starting position at a faster rate, such that the percentage of each operating cycle of the forward stroke of said frame is greater than that of the return stroke.

* * * * *